(12) United States Patent
Torget

(10) Patent No.: US 6,228,177 B1
(45) Date of Patent: May 8, 2001

(54) AQUEOUS FRACTIONATION OF BIOMASS BASED ON NOVEL CARBOHYDRATE HYDROLYSIS KINETICS

(75) Inventor: Robert W. Torget, Littleton, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 09/292,770

(22) Filed: Apr. 14, 1999

Related U.S. Application Data

(63) Continuation-in-part of application No. 08/723,399, filed on Sep. 30, 1996, now Pat. No. 6,022,419.

(51) Int. Cl.[7] ............... C13K 1/02; C08B 5/04; C12P 19/02; C07G 17/00
(52) U.S. Cl. ............... 127/37; 127/1; 435/105; 536/56; 536/124; 536/127
(58) Field of Search ............... 127/1, 37; 435/105; 536/56, 124, 127

(56) References Cited

U.S. PATENT DOCUMENTS

| | | |
|---|---|---|
| 1,014,311 | 1/1912 | Lillie . |
| 1,023,257 | 4/1912 | Lillie . |
| 3,480,476 | 11/1969 | Abbot . |
| 3,787,241 | 1/1974 | Eickemeyer . |
| 4,432,805 * | 2/1984 | Nuuttila et al. ............... 127/37 |
| 4,615,742 * | 10/1986 | Wright ............... 127/37 |
| 4,706,903 | 11/1987 | Brink et al. . |
| 4,708,746 | 11/1987 | Hinger . |
| 4,728,367 | 3/1988 | Huber et al. . |
| 4,880,473 | 11/1989 | Scott et al. . |
| 4,908,098 | 3/1990 | DeLong . |
| 4,941,944 | 7/1990 | Chang et al. . |
| 5,125,977 | 6/1992 | Grohmann et al. . |
| 5,188,673 | 2/1993 | Clausen et al. . |
| 5,366,558 | 11/1994 | Brink . |
| 5,389,346 | 2/1995 | Copeland, Jr. . |
| 5,424,417 | 6/1995 | Torget et al. . |
| 5,503,996 * | 4/1996 | Torget et al. ............... 435/105 |
| 6,022,419 * | 2/2000 | Torget et al. ............... 127/37 |

FOREIGN PATENT DOCUMENTS 263661  7/1968  (AT) .

* cited by examiner

Primary Examiner—Mark L. Bell
Assistant Examiner—Patricia L. Hailey
(74) Attorney, Agent, or Firm—Paul J. White

(57) ABSTRACT

A multi-function process for hydrolysis and fractionation of lignocellulosic biomass to separate hemicellulosic sugars from other biomass components comprising extractives and proteins; a portion of a solubilized lignin; cellulose; glucose derived from cellulose; and insoluble lignin from said biomass comprising:

a) introducing either solid fresh biomass or partially fractioned lignocellulosic biomass material with entrained acid or water into a reactor and heating to a temperature of up to about 185° C.–205° C.

b) allowing the reaction to proceed to a point where about 60% of the hemicellulose has been hydrolyzed in the case of water or complete dissolution in case of acid;

c) adding a dilute acid liquid at a pH below about 5 at a temperature of up to about 205° C. for a period ranging from about 5 to about 10 minutes; to hydrolyze the remaining 40% of hemicellulose if water is used.

d) quenching the reaction at a temperature of up to about 140° C. to quench all degradation and hydrolysis reactions; and e) introducing into said reaction chamber and simultaneously removing from said reaction chamber, a volumetric flow rate of dilute acid at a temperature of up to about 140° C. to wash out the majority of the solubilized biomass components, to obtain improved hemicellosic sugar yields.

13 Claims, 1 Drawing Sheet

AQUEOUS FRACTIONATION OF BIOMASS BASED ON NOVEL CARBOHYDRATE HYDROLYSIS KINETICS

The present invention is a continuation-in-part of U.S. patent application Ser. No. 08/723,399 filed Sep. 30, 1996, now U.S. Pat. No. 6,022,419, and relates to the innovation of introducing a process hot washing step at elevated temperatures (>135° C.) before the hydrolysis liquors or the treated solids are flashed to atmospheric pressure in a continuous process of using hot acidic medium for hydrolysis and fractionation of biomass into its major components, in several stages.

CONTRACTUAL ORIGIN OF THE INVENTION

The United States Government has rights in this invention under contract No. DE-AC36-98GO10337 between the United States Department of Energy and the National Renewable Energy Laboratory, a division of the Midwest Research Institute.

BACKGROUND OF THE INVENTION

1. Field of the Invention

The invention process uses a non-flowing plug flow reactor for the chemical conversions followed by using a flowing reactor at elevated temperatures solely to "hot wash" the solubilized components from the solid matrix. Alternatively, in the continuous process, a continual shrinking bed reactor may be employed.

The continuous process of using a hot acidic medium for fractionation of biomass components (e.g., hemicellulose and cellulose sugars, lignin, and extractives) provides high yields of sugars, e.g xylose and glucose.

Utilization of the continual shrinking bed reactor in the fractionation of lignocellulosic biomass so that the liquid to solid ratio is kept relatively constant increases yields of the solubilized sugars and increases concentrations of the released sugars by minimizing the residence time of the liquor fraction in the reactor.

2. Description of the Prior Art

Lignocellulosic biomass which is available in abundance can be used as an inexpensive feed stock for production of renewable fuels and chemicals. Current processes for this conversion involve chemical and/or enzymatic treatment of the biomass to hydrolyze cellulose and hemicellulose into their respective sugars. Enzymatic processes require the use of expensive biocatalysts and have the added burden of transporting lignin-slurries through the entire operating train. Current chemical processes for conversion of lignocellulosic biomass either require expensive chemical recycle or because of the prolonged exposure of the released sugars to the hydrolysis conditions, result in sugar degradation to by-products. Accordingly, current processes for producing sugars from lignocellulosic biomass are expensive processes and low cost production of renewable fuels and chemicals using these current processes are not realized.

Further, in current continuous processes for the production of sugars from starch or lignocellulosic biomass, the reactors for hydrolysis of the lignocellulosic feedstocks by acid catalysis to produce carbohydrates for chemicals or fuels use reactor dimensions based on the bulk packing density of the feed material, thereby limiting the yields of solubilized carbohydrates as a function of hydrolysis conditions, and the reactors are expensive due to being designed for the incoming feed, and thus, under-utilize the entire reactor volume.

U.S. Pat. No. 4,880,473 entails a process for treatment of hemicellulose and cellulose in two different configurations. Hemicellulose is treated with dilute acid in a conventional process. The cellulose is separated out from the "prehydrolyzate" and then subjected to pyrolysis at high temperatures. Further, the process step between the hemicellulose and cellulose reactions require a drying step with a subsequent pyrolysis high temperature step at 400° C.–600° C. for conversion of the cellulose to fermentable products.

U.S. Pat. No. 5,366,558 uses two "stages" to hydrolyze the hemicellulose sugars and the cellulosic sugars in a countercurrent process using a batch reactor, and results in poor yields of glucose and xylose using a mineral acid. Further, the process scheme is complicated and the economic potential on a large-scale to produce inexpensive sugars for fermentation is low.

U.S. Pat. No. 5,188,673 employs concentrated acid hydrolysis which has benefits of high conversions of biomass, but suffers from low product yields due to degradation and the requirement of acid recovery and recycle. Sulfuric acid concentrations used are 30–70 weight percent at temperatures less than 100° C.

An organic solvent for pretreatment of biomass in a counter current process configuration, using a single reactor in which small particles of biomass are introduced from the top and the solvent is contacted in a counter-current fashion from the bottom of the reactor is disclosed in U.S. Pat. No. 4,941,944. The process uses high concentrations (about 80%) of the solvent with a small amount of acid, if needed. The use of a solvent in this process necessitates recovery schemes which are cost-prohibitive insofar as the economics of the process is concerned.

Specific hydrolysis of cellulose by mild treatment with acid followed by treatment with high-pressure steam is disclosed in U.S. Pat. No. 4,708,746; however, the use of high-pressure steam and related capital-intensive equipment does not result in complete hydrolysis.

Biomass hydrolysis of almost exclusively hemicellulose sugars is disclosed in U.S. Pat. No. 4,668,340, wherein acid is introduced countercurrent to the biomass and is removed from each stage to be fed to the next in its sequence. The objective in this patent is to minimize the hydrolysis of cellulose (and the pre-hydrolysis of a lignocellulosic feed is ultimately to produce a cellulosic pulp containing 94%–97% of the feed alpha-cellulose).

Both U.S. Pat. Nos. 5,125,977 and 5,424,417 relate to "prehydrolysis" of lignocellulosic biomass to solubilize the hemicellulosic sugars with concomitant release of some soluble lignin, thereby rendering the remaining cellulose more readily digestible with enzymes or other chemical means—thus these patents disclose only prehydrolysis.

Austrian Patent No. 263,661 discloses dissolution of the three major components of biomass (lignin, hemicellulose and cellulose) in a flow thru reactor using hot compressed water at temperatures between 140° C.–350° C. No yields of the carbohydrate fractions are disclosed in which the carbohydrates are fractionated "cleanly".

U.S. Pat. Nos. 1,014,311; 1,023,257; 3,480,476; 4,728,367; 3,787,241; 4,706,903; 4,645,541; and 5,398,346 disclose various and sundry processes for converting starch or lignocellulosic biomass using an array of reactors; however, these patents neither acknowledge nor address any benefits associated with keeping the solid to liquid ratio the same or constant as sugars are solubilized and conveyed out of the reaction zone. Neither do these patents address the concept of using a nonflowing plug flow reactor for chemical conversions of the biomass followed by the use of a flowing reactor at elevated temperatures solely to "hot wash" the solubilized components from the solid matrix, to obtain: 1) higher yields of carbohydrate; 2) less lignin reprecipitating on the solid matrix; and 3) the production of a solid lignocellulosic substrate that is hydrolyzed by cellulases 10× the rates observed when the "hot wash" step is not used.

Heretofore, there has not been described a process for complete fractionation of lignocellulsic biomass using a dilute acidic medium in a flow-thru process in which: 1) the solid to liquid ratio of the lignocellulosic biomass and hydrolysis liquor has been kept the same or constant as sugars and other biomass components are solubilized and conveyed out of the reaction zone; or 2) using a nonflowing plug flow reactor for chemical conversions of the biomass followed by using a flowing reactor at elevated temperatures to take advantage of novel hydrolysis kinetics of hemicellulosic sugars, wherein a process "hot washing" step is introduced at elevated temperatures (>135° C.) before the hydrolysis liquors or the treated solids are flashed to atmospheric pressure.

SUMMARY OF THE INVENTION

One object of the invention is to provide a process for hydrolysis and fractionation of lignocellulosic biomass into separate streams comprised of relatively pure components.

Another object of the present invention is to provide a process for hydrolysis to sugars of hemicellulose at high yields.

A further object of the invention is to provide a process for hydrolysis and fractionation of lignocellulosic biomass using dilute acid.

A still further object of the invention is to provide a process for hydrolysis and fractionation of lignocellulosic biomass using dilute acid to convert hemicellulose into monomeric sugars at high yields.

A further object yet still of the invention is to hydrolyze hemicellulose into its component sugars at high yields while providing a solid material containing much, if not almost all, of the original cellulose and some of the lignin.

Another object of the invention is to provide a continuous process for complete hydrolysis and fractionation of lignocellulosic biomass with dilute acid in a reactor configuration that minimizes the time the liquid or hydrolysis liquor spends in the reaction zone.

A further object of the invention is to provide a process for hydrolysis and fractionation of lignocellulosic biomass using dilute acid wherein higher yields of solubilized sugars are obtained in higher concentrations.

To achieve the hydrolysis and fractionation of lignocellulosic feedstocks to produce high yields of soluble sugars for fermentation to final products at high productivity, the invention utilizes a series of flow-through co-current, counter-current, or stand-alone stages which enable efficient contact of dilute acid and biomass, thereby separating solubilized components from the solid.

The fractionation may be composed of up to four functional elements linked co-currently, countercurrently, or as independent single pass units, depending upon whether the solubilized components are to be mixed or separated from other solubilized components from other functions.

In the innovative prehydrolysis mode of the invention, the hemicellulosic sugars are hydrolyzed from the biomass using aqueous conditions below pH 5.0 and reaction times and temperatures sufficient to remove the hemicellulosic sugars in a concurrent reactor mode. The hydrolyzed slurry is then cooled by either contacting with hot washing liquor or by flashing to a temperature between about 125° C.–190° C., and the solids are washed with sufficient dilute acid or water, to remove 80%–100% by weight of the solubilized biomass components. The solids and entrained liquor and the washate are then flashed to ambient pressure for further processing.

In the innovative total hydrolysis mode of the invention, the hemicellulose sugars are hydrolyzed from the biomass aqueous conditions below pH 5.0 and reaction times and temperatures sufficient to remove the hemicellulosic sugars in a concurrent reactor mode. The slurry is then conveyed to a countercurrent hydrolysis reactor to hot wash the hemicellulosic sugars away from the solid lignocellulosic substrate. The solids, either in a concurrent or countercurrent mode is then subjected to hydrolysis conditions below pH 5.0 and reaction times and temperatures sufficient to hydrolyze the cellulose. Next, the solids with entrained liquor are flashed or otherwise cooled to a temperature between about 125° C. to about 200° C. and washed with about two voids of an aqueous solution to remove solubilized components before recondensation occurs.

The process produces significantly higher yields of sugar in all reactor configurations compared to processes without the "hot wash" step.

DETAILED DESCRIPTION OF THE INVENTION

Figure 1:
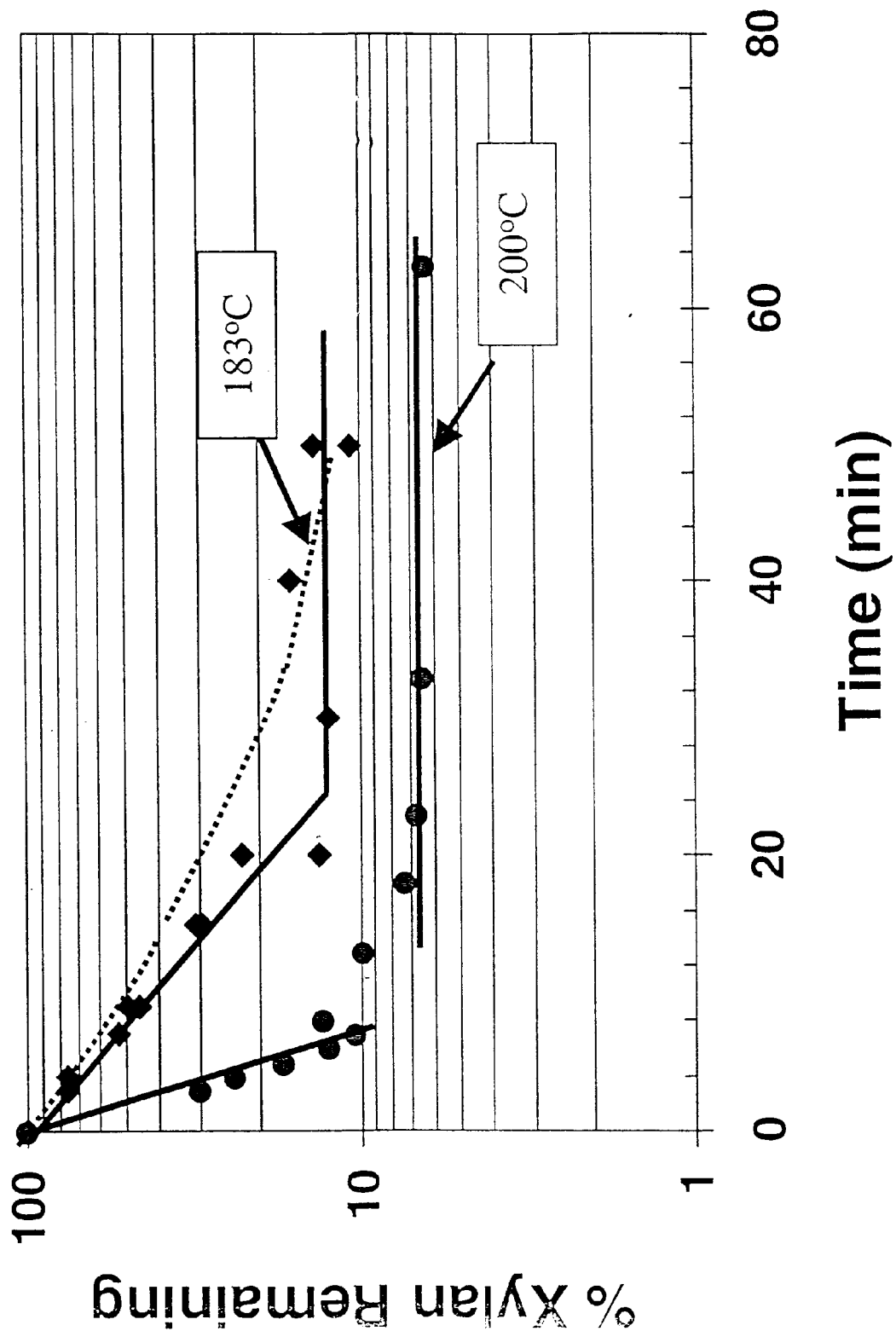
FIG. 1 is a graph depicting the autohydrolysis of hardwood xylan at 183° C. (♦) and 200° C. (●) using flowing hot water. The dashed line is a computer simulated curve using biphasic kinetic modeling described in the literature. As is apparent a single species of xylan is released until a recalcitrant fraction, which is temperature dependent, is reached, and no more xylan can be hydrolyzed.

The hydrolytic release of hemicellulosic sugars below pH 5.0 has been kinetically described as a pseudo first order irreversible reaction as shown below in equation (1); and gives rise to a curved kinetic release of xylan when graphed on a semilog plot as seen in FIG. 1, represented as the dashed line.

Hemicellulosic Hydrolysis:

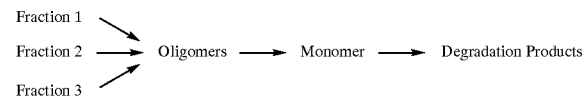

(1)

However, in view of data from prehydrolysis in Example I and the data from FIG. 1, the invention calls into question the kinetics of equation (1) for hemicellulose hydrolysis, and this has profound implications on process designs and yields of carbohydrate.

Below is depicted the actual kinetics in accordance with the invention findings:

Hemicellulosic hydrolysis:
At Reaction Temperature:
T>T critical for total hydrolysis

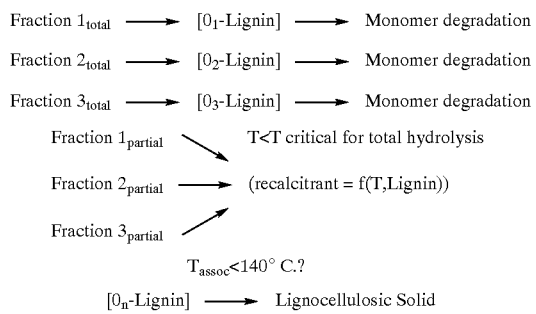

The invention provides an efficient method for hydrolysis and fractionation of lignocellulosic biomass and converts it at very high yields to soluble sugars which may be fermented to the final product at high productivity, as opposed to the use of dilute acid for primarily hydrolyzing hemicellulose exclusively or for complete hydrolysis using concentrated acid.

The invention multi-function process for hydrolysis and fractionation of lignocellulosic biomass to seperate hemicellulosic sugars from other biomass components comprising extractives and proteins; a portion of a solubilized lignin; cellulose; glucose derived from cellulose; and insoluble lignin from said biomass, is an in improvement comprising:

a) introducing either solid fresh biomass or partially fractioned lignocellulosic biomass material containing entrained water or acid at pH<5.0 into a reactor and heating to a temperature of up to about 185° C. to about 205° C.;

b) allowing the reaction to proceed to a point where about 60% of the hemicellulose has been hydrolyzed, in the case of water only for about 6–10 minutes, or in the case when acid is present for about 5–10 minutes for complete dissolution;

c) adding a dilute acid liquid at a pH below about 5.0 at a temperature of up to about 205° C. for a period ranging from about 5 to about 10 minutes when water is used in step b);

d) quenching the reaction at an average temperature of up to about 140° C. to quench all degradation and hydrolysis reactions; and e) introducing into the reaction chamber and simultaneously removing from the reaction chamber, a volumetric flow rate of dilute acid at an average temperature of up to about 140° C. to wash out the majority of the solubilized biomass components, to obtain improved hemicellulosic sugar yields and prevent recondensation reactions from occurring.

In step e) the dilute acid is introduced in an amount about 2 times the volume of the reaction chamber, and the dilute acid may be a mineral acid selected from the group consisting of sulfuric acid, phosphoric acid, and nitric acid, or carbonic acid.

In step c), 0.15 weight percent of sulfuric acid is used, and in step e), 0.07 weight percent of sulfuric acid is used.

The process may proceed in a reactor that is a plug flow reactor, and this reactor may be a continual shrinking bed reactor.

The continual shrinking bed reactor may be a cylindrical reactor with "broken" internal flights to allow the biomass to fall back to maintain a relatively constant solid to liquid ratio, wherein the volumetric flow rate is sufficient to keep the solid and liquid at a constant ratio throughout the process so as to increase the linear velocity.

The example hereinafter provided will serve to further illustrate the complete hydrolysis of lignocellulosic biomass using dilute acid in a flow-thru process.

EXAMPLE I

A parr reactor was charged with 20 g of BD yellow poplar and 100 ml of water was added to wet the biomass. The reactor was sealed and submerged in a 185° C. sand bath. Once the reactor reached about 160° C., the reactor was placed in a parr stand and the heater turned on to 185° C. Hot water (100 ml at 205° C.) was added to bring the slurry to 183° C. and the reaction proceeded for about 7 minutes. At the 7 minute mark, 200 ml of 220° C. 0.15 wt % of sulfuric acid was added while varying the temperature between about 185° C.–205° C. for times ranging from about 3 to about 10 minutes. The reaction was then quenched to about 140° C. in a water bucket that quenched all degradation and hydrolysis reactions. Two void volumes of 140° C. 0.07wt % sulfuric acid was pumped in and simultaneously pumped out (in a CSTR reactor mode) to wash out the majority (80%) of the solubilized biomass components.

The yields of the solubilized hemicellulosic sugars were from about 75% to 85%, but are obtained under less severe conditions than traditional methods not using a "hot wash". The enzymatic digestibility of the solids, using the NREL CAT 009 protocol, result in complete release of the glucose in 12 hours at 50° C., compared to 3–5 days using the traditional batch hydrolysis approach.

FIG. 1 is a graph depicting xylan hydrolysis kinetics using flowing hot water.

As can be seen from this graph, the xylan hydrolysis kinetics when using a wash mode to prevent recondensation reactions from occurring, is "apparently" faster than kinetics not using a "wash" mode. Further, by including this "hot wash" process step, theoretical yields of xylose as high as 85%–95% can be obtained using a plug flow reactor instead of the reported yields of 80% not using a "hot wash" step. Further still, the lignocellulosic substrate is more amenable to enzymatic saccharification, and one obtaining 100% conversion of the cellulose to glucose.

While the present invention uses a non-flowing plug flow reactor for the chemical conversions followed, by the use of a flowing reactor at elevated temperatures for the "hot wash" step, the invention may also use a flow-through system where fluid moves with respect to the solid lignocellulose. The lignocellulose solids may be stationary, travel in a counter-current or cross-current fashion. It is even possible for the system to use a co-current or stationary system which is agitated. One typical design is a percolation reactor. One can perform a solid-liquid separation in the flow-through system by using a screw-like device to cause the separation continuously during or at the end of prehydrolysis. Important to the process is the movement and removal of fluid during the prehydrolysis to separate soluble products as they are released from the solid lignocellulosic residue.

Fluid need not be flowing constantly, but may be pulsed or stopped for a period of time, but it does need to move at least part of the time before the end of the prehydrolysis process. Alternatively, a pulsed system may blow air or other inert gas through the system to help push out the prehydrolyzate. An air pulse may also provide an overpressure or simply agitate the system.

A continuous prehydrolysis reactor may also be used. Such a reactor would have lignocellulosic material driven through the reactor while fluid is passed through the material, typically in a counter-current or cross-current manner. For example, if the prehydrolysis reactor is in the configuration of a column, the lignocellulosic material may be augured into the bottom of the column and removed from the top while fluid containing the degrading compound (s) is added at the top and passes through the biomass to be removed at the bottom. The reverse configuration is also possible. Alternatively, the lignocellulosic substrate may be driven laterally while fluid is applied on top and allowed to percolate down to be removed at the bottom.

Appropriate particle sizes vary with the feedstock and its inherent physical properties. Particle sizes appropriate for ground wood are in the range of about 0.1 mm to 30 mm, preferably in the range of 0.5 mm to 4 mm. Other materials may be larger or smaller depending on the particular materials, particularly those having at least one thin dimension such as paper or straw. If one relies on the effects of gravity or floatation to cause movement of the solid lignocellulosic material with respect to the fluid, then particle size may need to be adjusted appropriately to permit solid/liquid movement in the time period of the prehydrolysis. Optimum sizes will depend on the particular lignocellullosic material used and the reactor size and construction and are readily determinable by routine experimentation.

The lignocellulosic substrate may consist of hardwood, grasses, softwood, waste paper and pulp, municipal wastes, agricultural wastes such as straws, corn cobs, corn stover, biomass of all types, etc. and mixtures thereof. The choice of lignocellulosic substrate will depend on the availability and cost of lignocellulosic materials.

In the present invention, the reactor generally may have solids content of between about 5% and 50%, preferably about 8%–30%, when the solids are present with the liquid at the end of the prehydrolysis. The higher solids content are generally more desirable but the concentration is limited by the designs of the reactor and the need for fluid to flow throughout the solids. At the beginning of the prehydrolysis, the solids content may range from 0 to 100% by weight as the reactor may initially contain only the lignocellulosic solids or the degrading fluid.

While the invention has been described with respect to specific embodiments, it is to be expected that, by the application of current knowledge, those skilled in the art may readily modify or adapt for various applications such specific embodiments without departing from the generic concept, and such adaptations and modifications should and are intended to be comprehended within the meaning of the range of equivalence of the disclosed embodiments. Further, it is to be understood that the terminology employed herein is for purposes of description and not limitation.

I claim:

1. In a multi-function process for hydrolysis and fractionation of lignocellulosic biomass to separate hemicellulosic sugars from other biomass components comprising extractives and proteins; a portion of a solubilized lignin; cellulose; glucose derived from cellulose; and insoluble lignin from said biomass, the improvement comprising:

a) introducing either solid fresh biomass or partially fractioned lignocellulosic biomass material containing entrained water or acid at pH<5.0 into a reactor and heating to a temperature from about 185° C. to about 205° C.;

b) allowing the reaction to proceed to a point where about 60% by weight of the hemicellulose has been hydrolyzed, in the case of water only for about 6–10 minutes, or in the case when acid is present for about 5–10 minutes for complete dissolution;

c) adding a dilute acid liquid at a pH below about 5.0 at a temperature of up to about 205° C. for a period ranging from about 5 to about 10 minutes when water is used in step b);

d) quenching the reaction at an average temperature of up to about 140° C. to quench all degradation and hydrolysis reactions; and e) introducing into said reaction chamber and simultaneously removing from said reaction chamber, a volumetric flow rate of dilute acid at an average temperature of up to about 140° C. to wash out the majority of the solubilized biomass components, to obtain improved hemicellulosic sugar yields and prevent recondensation reactions from occuring.

2. The process of claim 1, wherein, in step (e) said dilute acid is introduced in an amount about 2 times the volume of the reaction chamber.

3. The process of claim 1 wherein said dilute acid is a mineral acid or carbonic acid.

4. The process of claim 3, wherein said mineral acid is selected from the group consisting of sulfuric acid, phosphoric acid, and nitric acid.

5. The process of claim 4, wherein said dilute acid is sulfuric acid.

6. The process of claim 5, wherein in step (c), 0.15 weight percent of sulfuric acid is used, and in step e, 0.07 weight percent of sulfuric acid is used.

7. The process of claim 6 in which the reactor is a plug flow reactor.

8. The process of claim 7 in which the reactor is a continual shrinking bed reactor.

9. The process of claim 8, in which said continual shrinking bed reactor comprises means to allow the biomass to fall back to maintain a constant solid to liquid ratio.

10. The process of claim 9 wherein the volumetric flow rate is sufficient to keep the solid and liquid at a constant ratio throughout said process so as to increase the linear velocity.

11. The process of claim 6 wherein, in step (e), said majority of the solubilized biomass components is 80 to 100 weight percent.

12. The process of claim 11, wherein said biomass is yellow poplar.

13. The process of claim 12, wherein said biomass is corn stover, rice-straw, a soft wood mix, bagasse, or clarified municipal solid waste.

* * * * *